United States Patent
Sano et al.

(10) Patent No.: US 10,034,011 B2
(45) Date of Patent: Jul. 24, 2018

(54) VIDEO CODING APPARATUS

(71) Applicants: Nippon Telegraph and Telephone Corporation, Tokyo (JP); NTT Electronics Corporation, Yokohama-shi, Kanagawa-ken (JP)

(72) Inventors: Takashi Sano, Yokosuka (JP); Takayuki Onishi, Yokosuka (JP); Atsushi Shimizu, Yokosuka (JP); Katsuyuki Ozaki, Tokyo (JP); Ken Nakamura, Tokyo (JP)

(73) Assignees: Nippon Telegraph And Telephone Corporation, Tokyo (JP); NTT Electronics Corporation, Yokohama-shi, Kanagawa-ken (JP)

( * ) Notice: Subject to any disclaimer, the term of this patent is extended or adjusted under 35 U.S.C. 154(b) by 148 days.

(21) Appl. No.: 15/250,281

(22) Filed: Aug. 29, 2016

(65) Prior Publication Data
US 2017/0064322 A1    Mar. 2, 2017

(30) Foreign Application Priority Data
Aug. 31, 2015 (JP) .................... 2015-170887

(51) Int. Cl.
*H04N 19/119* (2014.01)
*H04N 19/196* (2014.01)
(Continued)

(52) U.S. Cl.
CPC ........... *H04N 19/50* (2014.11); *H04N 19/105* (2014.11); *H04N 19/119* (2014.11);
(Continued)

(58) Field of Classification Search
CPC .... H04N 19/50; H04N 19/105; H04N 19/119; H04N 19/154; H04N 19/176; H04N 19/196; H04N 19/31; H04N 19/96
(Continued)

(56) References Cited

U.S. PATENT DOCUMENTS

2005/0089099 A1\* 4/2005 Lee .................... H04N 19/56
375/240.16
2008/0165855 A1\* 7/2008 Wang .................. H04N 19/105
375/240.16
(Continued)

FOREIGN PATENT DOCUMENTS

JP    2013-042304 A    2/2013
JP    2013-157662 A    8/2013
(Continued)

OTHER PUBLICATIONS

Notice of Reasons for Rejection, Japanese Patent Application No. 2015-170887, dated Jun. 28, 2016.
(Continued)

*Primary Examiner* — William C Vaughn, Jr.
*Assistant Examiner* — Jae N Noh
(74) *Attorney, Agent, or Firm* — Harness, Dickey & Pierce, P.L.C.

(57) ABSTRACT

A video coding apparatus comprises a motion prediction unit configured to perform motion prediction for a plurality of coding unit sizes of an original image serving as the picture of an input video signal and evaluate results obtained by the motion prediction for the coding unit sizes so as to supply a first evaluation value; a merge mode evaluation unit configured to evaluate each of merge candidates on a coding unit of the merge size determined by a merge size determination unit so as to supply a second evaluation value of each of the merge candidates; and an inter-prediction mode
(Continued)

determination unit configured to determine a mode used for coding on the basis of the second evaluation value obtained by the merge mode evaluation unit and the first evaluation value of the coding unit sizes.

16 Claims, 7 Drawing Sheets

(51) Int. Cl.
    *H04N 19/31*     (2014.01)
    *H04N 19/50*     (2014.01)
    *H04N 19/176*     (2014.01)
    *H04N 19/154*     (2014.01)
    *H04N 19/105*     (2014.01)
    *H04N 19/96*     (2014.01)

(52) U.S. Cl.
    CPC ......... *H04N 19/154* (2014.11); *H04N 19/176* (2014.11); *H04N 19/196* (2014.11); *H04N 19/31* (2014.11); *H04N 19/96* (2014.11)

(58) Field of Classification Search
    USPC ...................................... 375/240.12
    See application file for complete search history.

(56) References Cited

U.S. PATENT DOCUMENTS

| | | | |
|---|---|---|---|
| 2014/0146876 A1 | 5/2014 | Takehara et al. | |
| 2015/0189306 A1* | 7/2015 | Li ....................... | H04N 19/136 |
| | | | 375/240.16 |
| 2016/0191920 A1 | 6/2016 | Kim et al. | |
| 2017/0026645 A1* | 1/2017 | Zhou .................... | H04N 19/124 |

FOREIGN PATENT DOCUMENTS

| | | |
|---|---|---|
| JP | 2014-107708 A | 6/2014 |
| JP | 2014-158164 A | 8/2014 |
| JP | 2015-144467 A | 8/2015 |
| WO | WO-2015020504 A1 | 2/2015 |

OTHER PUBLICATIONS

Huang Xiao-Qiao et al: "Adaptive depth search range for HEVC coding unit size selection", Signal and Information Processing Association Annual Summit and Conference (APSIPA), 2014 Asia-Pacific, Asia-Pacific Signal and Information Processing Ass, Dec. 9, 2014 (Dec. 9, 2014), pp. 1-6.

OA-1, Extended European Search Report for EP 16186115.8, EPO/Munich, dated Dec. 9, 2016.

* cited by examiner

VIDEO CODING APPARATUS

BACKGROUND OF THE INVENTION

Field of the Invention

The present invention relates to a video coding apparatus.
Priority is claimed on Japanese Patent Application No. 2015-170887, filed Aug. 31, 2015, the content of which is incorporated herein by reference.

Description of Related Art

Moving picture experts Group (MPEG)-2, MPEG-4, and MPEG-4/Advanced Video Coding (AVC) are used in a video coding technique in many cases. In recent years, High Efficiency Video Coding (HEVC) serving as a next generation video coding standard has been standardized and is thought likely to spread in the future. In HEVC, coding using various block sizes is supported to increase a degree of freedom of a coding process.

Figure 7:
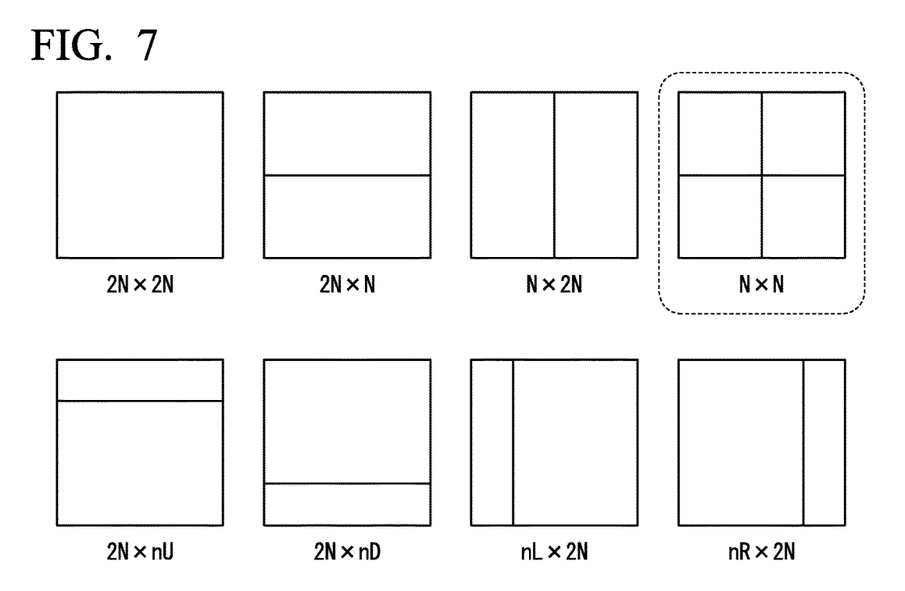
FIG. 7 shows a PU dividing pattern in HEVC.

FIG. 7 shows a prediction unit (PU) dividing pattern in HEVC. In HEVC, four coding units (CUs), that is, block sizes of 64×64, 32×32, 16×16, and 8×8, can be divided into seven or eight types of PUs shown in FIG. 7. The coding units are adaptively divided using a recursive quad tree structure so that high-efficiency coding can be performed. Also, in H.264/AVC and HEVC, two types of motion information coding modes are used, that is, one is a motion vector prediction coding mode in which a motion vector difference is coded and the other is a coding mode in which a motion vector difference is not transmitted. High efficiency coding is realized by alternatively using one of the modes. The modes are referred to as a direct mode (a skip mode when coding of a prediction error is not performed either) in H.264/AVC and a merge mode in HEVC.

The motion vector prediction coding selects a candidate from two prediction motion vector candidates and performs coding on the selected candidate.

Figure 8:
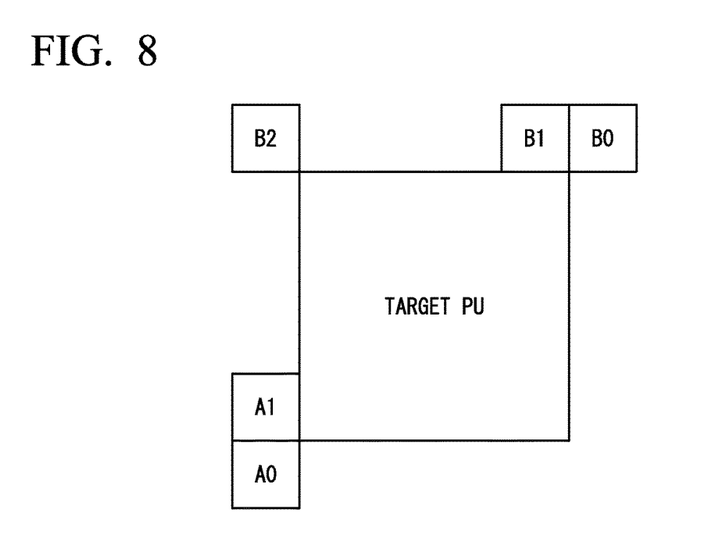
FIG. 8 shows spatial merge candidates in HEVC.

FIG. 8 shows spatial merge candidates in HEVC. As shown in FIG. 8, the merge coding registers a maximum of five motion vectors in a merge candidate list from temporal merge candidates, combined bi-predictive merge candidates, and zero merge candidates in addition to spatial merge candidates which use a motion vector in the vicinity of PU serving as a coded target (a target PU) and performs coding on the motion vectors. Therefore, there are prediction motion vector candidates (two types) and merge candidates (five types) for each of combinations between CU sizes (four types) and PU sizes (seven types). Since there are 4×7×(2+5)=196 combinations of all of the block sizes and the modes, a very large amount of calculation for the merge coding is required.

In order to solve such problems, a technique of reducing an amount of calculation needed for motion prediction is disclosed in, for example, Japanese Unexamined Patent Application, First Publication No. 2013-157662. In this technique, a differential value between a coded block serving as a processing target and a block of the same position in a reference picture is calculated, and it is determined whether a direct mode or a skip mode is used by performing a threshold value process of the differential value.

SUMMARY OF THE INVENTION

However, in the video coding apparatus disclosed in Japanese Unexamined Patent Application, First Publication No. 2013-157662, since amounts of calculation of motion prediction with respect to each target coding block are not uniformized, there is a disadvantage such as an increase in a hardware scale and a decrease in usage efficiency in mounting hardware.

The present invention was made in view of these circumstances, and an object of the present invention is to provide a video coding apparatus capable of reducing an amount of calculation needed to determine a coding mode.

An aspect of the present invention is a video coding apparatus in which motion prediction is performed on each picture of an input video signal in units of coding units using a temporal correlation of the picture, and a coding process is performed on a difference between the input video signal and a predicted image generated on the basis of result of the motion prediction, the video coding apparatus comprises a motion prediction unit configured to perform the motion prediction for a plurality of coding unit sizes of an original image serving as the picture of the input video signal and evaluate results obtained by the motion prediction for the coding unit sizes so as to supply a first evaluation value; a coding unit size determination unit configured to determine one of the coding unit sizes of the original image as a determined coding unit size on the basis of the first evaluation value; a prediction error calculating unit configured to calculate a prediction error representing a difference between the original image and the prediction image based on the determined coding unit size; an orthogonal transform unit configured to calculate an orthogonal transform value by performing a Hadamard transform on the prediction error value; a merge size determination unit configured to determine a merge size serving as a coding unit size of a merge mode on the basis of comparison between the orthogonal transform value and a threshold value; a merge mode evaluation unit configured to evaluate each of merge candidates on a coding unit of the merge size determined by the merge size determination unit so as to supply a second evaluation value of each of the merge candidates; and an inter-prediction mode determination unit configured to determine a mode used for coding on the basis of the second evaluation value obtained by the merge mode evaluation unit and the first evaluation value of the coding unit size determined by the coding unit size determination unit.

An another aspect of the present invention is A video coding apparatus in which motion prediction is performed on each picture of an input video signal in units of coding units using a temporal correlation of the picture, and a coding process is performed on a difference between the input video signal and a predicted image generated on the basis of result of the motion prediction, the video coding apparatus comprises a motion prediction unit configured to perform the motion prediction for a plurality of coding unit sizes of an original image serving as the picture of the input video signal and evaluate results obtained by the motion prediction for the coding unit sizes so as to supply a first evaluation value; a coding unit size determination unit configured to determine one of the coding unit sizes of the original image as a determined coding unit size on the basis of the first evaluation value; a prediction error calculating unit configured to calculate a prediction error value serving as a difference between the original image and the prediction image based on the determined coding unit size; a merge size determination unit configured to determine a merge size serving as a coding unit size of a merge mode on the basis of comparison between the prediction error value and a threshold value; a merge mode evaluation unit configured to evaluate each of merge candidates on a coding unit of the merge size determined by the merge size determination unit so as to supply a second evaluation value of each of the merge candidates; and an inter-prediction mode determination unit configured to determine a mode used for coding on the basis of the second evaluation value obtained by the merge mode evaluation unit and the first evaluation value of the coding unit size determined by the coding unit size determination unit.

In some cases, the merge size determination unit may determine the merge size to be the same size as the coding unit size of the coding unit when the orthogonal transform value or the prediction error value is smaller than the threshold value and determine the merge size to be a size which is one size smaller than the coding unit size of the coding unit when the orthogonal transform value or the prediction error value is equal to or greater than the threshold value.

In some cases, the threshold value may include a first threshold value and a second threshold value being greater than the first threshold value. The merge size determination unit may determine the merge size to be the same size as the coding unit size of the coding unit when the orthogonal transform value or the prediction error value is smaller than the first threshold value, determine the merge size to be a size which is one size smaller than the coding unit size of the coding unit when the orthogonal transform value or the prediction error value is equal to or greater than the first threshold value and smaller than the second threshold value, and determine the merge size to be a size which is two sizes smaller than the coding unit size of the coding unit when the orthogonal transform value or the prediction error value is equal to or greater than the second threshold value.

In some cases, the threshold value may include a first threshold value and a second threshold value being smaller than the first threshold value. The merge size determination unit may determine the merge size to be a size which is one size smaller than the coding unit size of the coding unit when the orthogonal transform value or the prediction error value is equal to or greater than the first threshold value, determine the merge size to be the same size as the coding unit size of the coding unit when the orthogonal transform value or the prediction error value is smaller than the first threshold value and equal to or greater than the second threshold value, and determine the merge size to be a size which is one size greater than the coding unit size of the coding unit when the orthogonal transform value or the prediction error value is smaller than the second threshold value.

In some cases, the merge size determination unit may determine the threshold value by scaling the average of orthogonal transform values or prediction error values of coding units in a completely coded picture. The coding units in the completely coding picture have the same coding unit size and the same temporal ID as the coding unit in the original image. The temporal ID indicates a hierarchical depth in hierarchical coding.

In some cases, the threshold value may be determined in accordance with a temporal ID indicating a depth in hierarchical coding.

In some cases, the threshold value may be determined in accordance with a value of a quantization parameter obtained on a quantization process.

In some cases, the threshold value may be determined by scaling variance of brightness values of the coding unit.

According to the present invention, it is possible to reduce an amount of calculation needed to determine a coding mode.

DETAILED DESCRIPTION OF THE INVENTION

Figure 1:
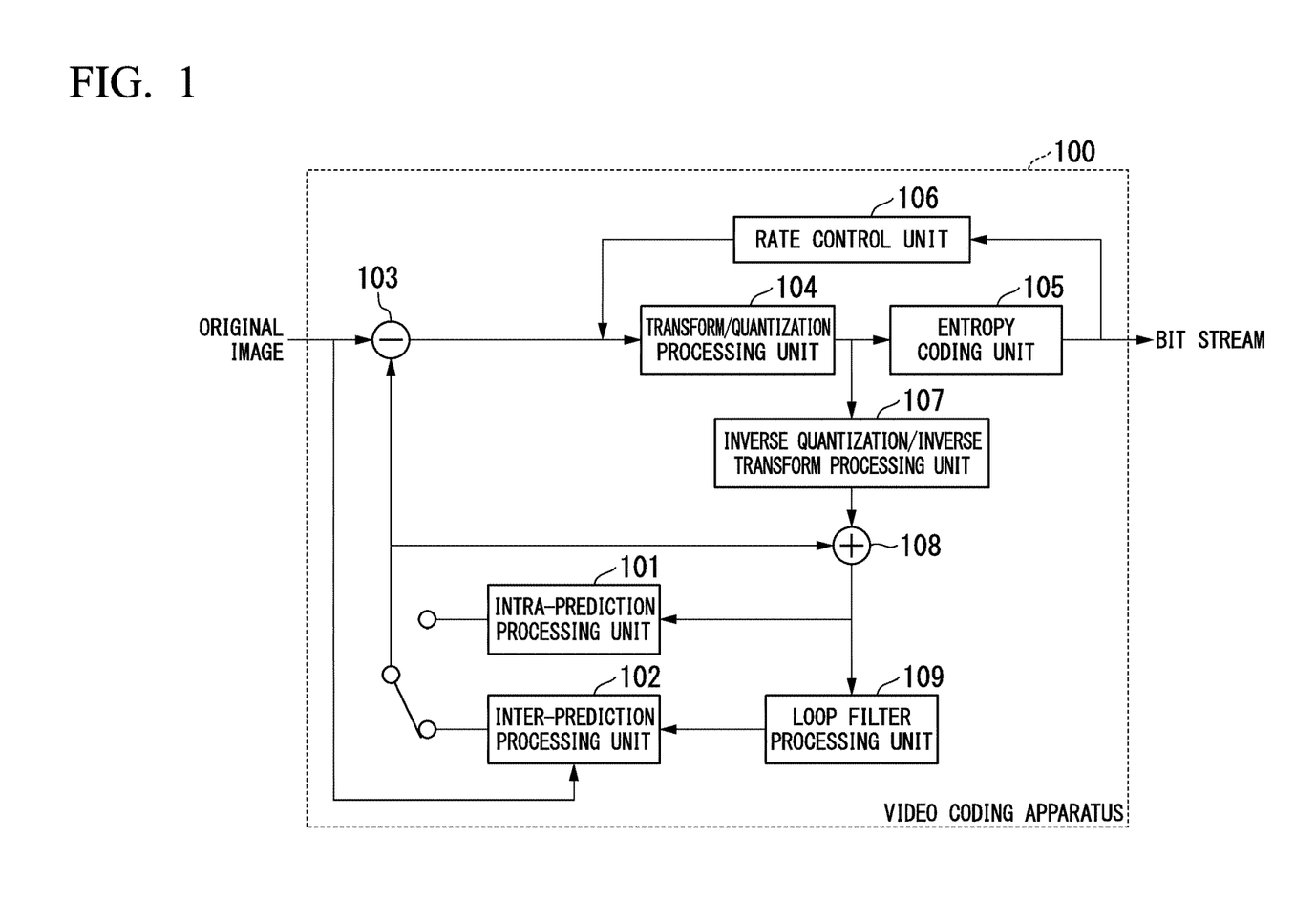
FIG. 1 is a block diagram showing a video coding apparatus according to an embodiment of the present invention.

Hereinafter, a video coding apparatus according to an embodiment of the present invention will be described with reference to the drawings. FIG. 1 is a block diagram showing a video coding apparatus 100 according to an embodiment and shows a configuration obtained by extracting only a functional block related to the embodiment. As shown in FIG. 1, the video coding apparatus 100 includes an intra-prediction processing unit 101, an inter-prediction processing unit 102, a prediction residual signal generating unit 103, a transform/quantization processing unit 104, an entropy coding unit 105, a rate control unit 106, an inverse quantization/inverse transform processing unit 107, a decoded signal generating unit 108, and a loop filter processing unit 109. In the video coding apparatus 100, a process in the inter-prediction processing unit 102 is different from the related art, and the other process is similar to a conventional general process used as a video coding apparatus such as in HEVC.

The video coding apparatus 100 receives an input video signal of a picture (an original image) serving as a coded target. The original image is a picture of each frame of a moving image serving as a target of a coding process. The video coding apparatus 100 divides a picture of the input video signal into coding tree units (CTUs), codes the coding tree units for every unit, and outputs a bit stream thereof as a coded stream. For the coding, the prediction residual signal generating unit 103 calculates a difference between an input video signal and a predicted signal serving as an output of the intra-prediction processing unit 101 or the inter-prediction processing unit 102 and outputs the difference as a prediction residual signal. The predicted signal indicates a predicted image. The transform/quantization processing unit 104 performs an orthogonal transform such as a discrete cosine transform on a prediction residual signal output by the prediction residual signal generating unit 103. The transform/quantization processing unit 104 quantizes transform coefficients obtained from results of the orthogonal transform and outputs the quantized transform coefficients. The entropy coding unit 105 performs entropy coding on the transform coefficients quantized by the transform/quantization processing unit 104 and outputs the transform coefficients as a coded stream (a bit stream). The rate control unit 106 receives coded information such as a coded amount as an input from the coded stream output by the entropy coding unit 105 and adaptively switches and outputs a quantization parameter needed for subsequent coding.

On the other hand, the transform coefficients quantized by the transform/quantization processing unit 104 are also input to the inverse quantization/inverse transform processing unit 107. The inverse quantization/inverse transform processing unit 107 outputs a prediction residual signal obtained by performing inverse quantization and an inverse orthogonal transform on the transform coefficients. The decoded signal generating unit 108 generates a decoded video signal of a coded target block which has been coded by adding the prediction residual signal and the predicted signal serving as the output of the intra-prediction processing unit 101 or the inter-prediction processing unit 102. Since the decoded video signal is used as a reference image in the inter-prediction processing unit 102, the decoded video signal is output to the loop filter processing unit 109. The loop filter processing unit 109 performs a filtering process which reduces coding distortion and outputs the reference image which has undergone the filtering process to the inter-prediction processing unit 102 as a decoded video signal.

Figure 2:
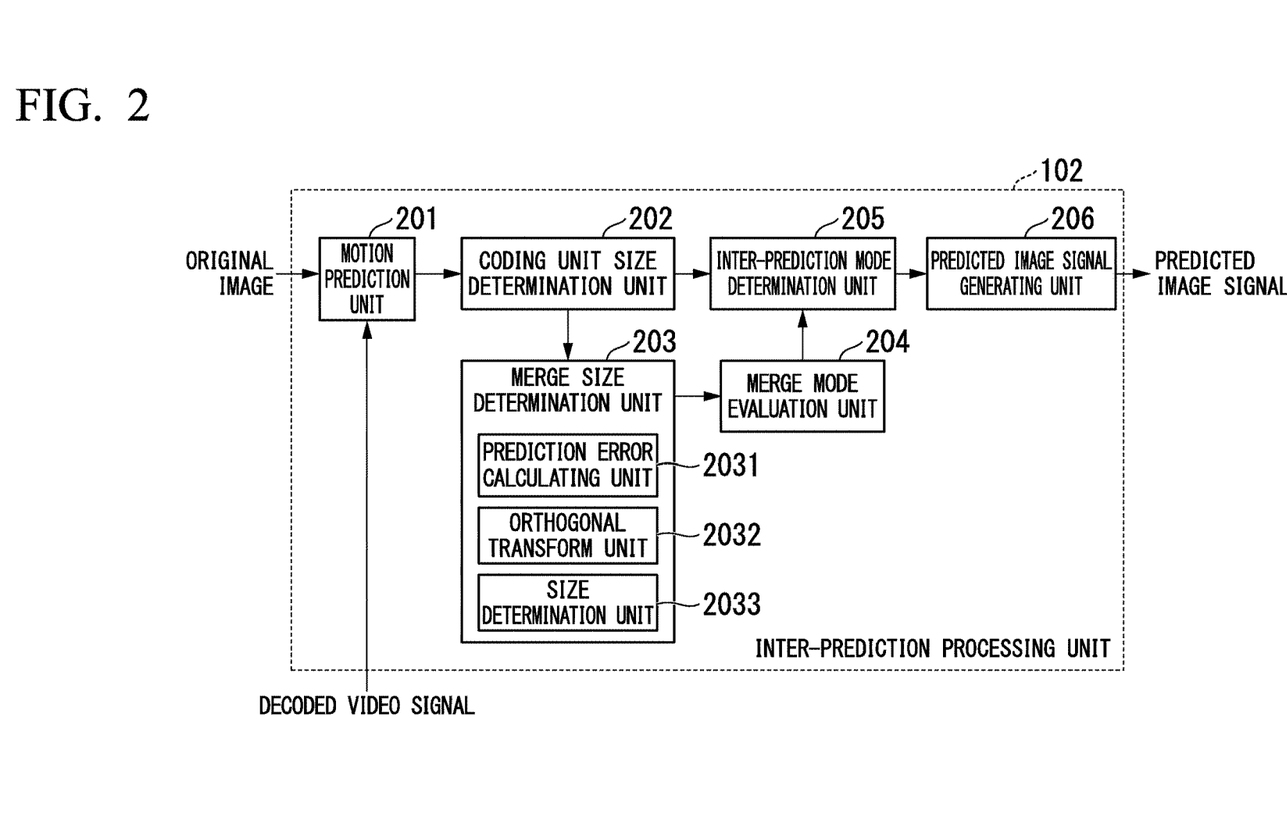
FIG. 2 is a block diagram showing an inter-prediction processing unit shown in FIG. 1.

Next, a configuration of the inter-prediction processing unit 102 shown in FIG. 1 will be described with reference to FIG. 2. FIG. 2 is a block diagram showing the inter-prediction processing unit 102 shown in FIG. 1. The inter-prediction processing unit 102 includes a motion prediction unit 201, a coding unit size determination unit 202, a merge size determination unit 203, a merge mode evaluation unit 204, an inter-prediction mode determination unit 205, and a predicted image signal generating unit 206. In the embodiment, a process in the merge size determination unit 203 is different from the related art, and an arbitrary general process can be applied to the process in the other units.

The motion prediction unit 201 receives inputs of an original image serving as a coded target and a decoded video signal serving as a reference image and performs motion prediction on coding unit sizes. The motion prediction retrieves an area similar to a coding unit in the original image (picture) in the reference image (picture) indicated by the decoded video signal. The motion prediction unit 201 outputs an evaluation value for each coding unit size to the coding unit size determination unit 202 as a result of the motion prediction. For example, a value obtained by adding an absolute value sum of a difference between pixels of a coding unit in the original image and pixels of an area corresponding to the reference image and a value corresponding to an amount of bits (coding cost) needed to describe a motion vector and a coding mode can be used as the evaluation value, but the present invention is not limited thereto. The coding unit size determination unit 202 determines a coding unit size used to code a predicted motion vector using the evaluation value for each coding unit size input from the motion prediction unit 201 and outputs the coding unit size to the merge size determination unit 203. In addition, the coding unit size determination unit 202 outputs predicted motion vector coding information including the coding unit size which has been determined to the inter-prediction mode determination unit 205.

The merge size determination unit 203 performs a threshold value process on a residual signal (SAD) of a coding unit size determined by the coding unit size determination unit 202 or a Hadamard coefficients (SATD) obtained by performing a Hadamard transform on the SAD. The merge size determination unit 203 determines one merge size used to perform merge evaluation and outputs the one merge size to the merge mode evaluation unit 204. The merge size determination unit 203 includes a prediction error calculating unit 2031, an orthogonal transform unit 2032, and a size determination unit 2033. The prediction error calculating unit 2031 calculates SAD of a coding unit of a coding unit size determined by the coding unit size determination unit 202. The SAD is a prediction error calculated as a differential value between a predicted image and an original image of a coding unit. The predicted image is a picture indicated by a predicted signal used to generate a reference image input from the loop filter processing unit 109. The orthogonal transform unit 2032 calculates SATD by performing a Hadamard transform on the SAD calculated by the prediction error calculating unit 2031. The size determination unit 2033 determines a merge size serving as a coding unit size of a merge mode on the basis of a result obtained by comparing an indicator with a threshold value. The size determination unit 2033 may use the SAD or the SATD as the indicator. Note that, when a merge size is determined through comparison between the SAD value and the threshold value by the size determination unit 2033, the merge size determination unit 203 may not include the orthogonal transform unit 2032.

The merge mode evaluation unit 204 performs a motion prediction process to evaluate a maximum of five merged candidates of a coding unit of a merge size determined by the merge size determination unit 203, calculates an evaluation value of each of the merged candidates on the basis of the motion prediction process, and outputs the evaluation value to the inter-prediction mode determination unit 205. An evaluation value as in the motion prediction unit 201 is used as the evaluation value. An area on the reference image which corresponds to the coding unit in the original image is specified from information of the motion vector which has been calculated with respect to the merge candidate of the coding unit.

The inter-prediction mode determination unit 205 receives inputs of evaluation values of motion prediction from the coding unit size determination unit 202 and the merge mode evaluation unit 204. The evaluation value of the motion prediction input from the coding unit size determination unit 202 is an evaluation value of a coding unit size determined by the coding unit size determination unit 202. The evaluation value of the motion prediction input from the merge mode evaluation unit 204 is an evaluation value of each of a maximum of five merged candidates of one merge size determined by the merge size determination unit 203. The inter-prediction mode determination unit 205 determines a coding unit size and an inter-prediction mode on the basis of the evaluation value of the motion prediction and transmits the coding unit size and the inter-prediction mode to the predicted image signal generating unit 206. The inter-prediction mode includes a mode in which the motion vector is coded or a merge mode in which the motion vector is not coded. The predicted image signal generating unit 206 generates a predicted image signal in accordance with the coding unit size and the inter-prediction mode determined by the inter-prediction mode determination unit 205 and transmits the predicted image signal to the prediction residual signal generating unit 103.

In the embodiment, the merge size determination unit 203 shown in FIG. 2 determines whether the merge size is set to be the same size as the coding unit or a size which is one size smaller than the coding unit using the coding unit size determined by the coding unit size determination unit 202 as a reference. The merge size determination unit 203 performs this determination in accordance with the SAD value or the SATD value of the coding unit. The merge size determination unit 203 determines the merge size so that the merge mode evaluation unit 204 can evaluate the merge mode with a small amount of calculation. Therefore, an amount of calculation needed for the motion prediction can be reduced without decreasing coding efficiency. Hereinafter, a case in which the SATD value is used will be described, but the same process can also be performed in a case in which the SAD value is used.

Figure 3:
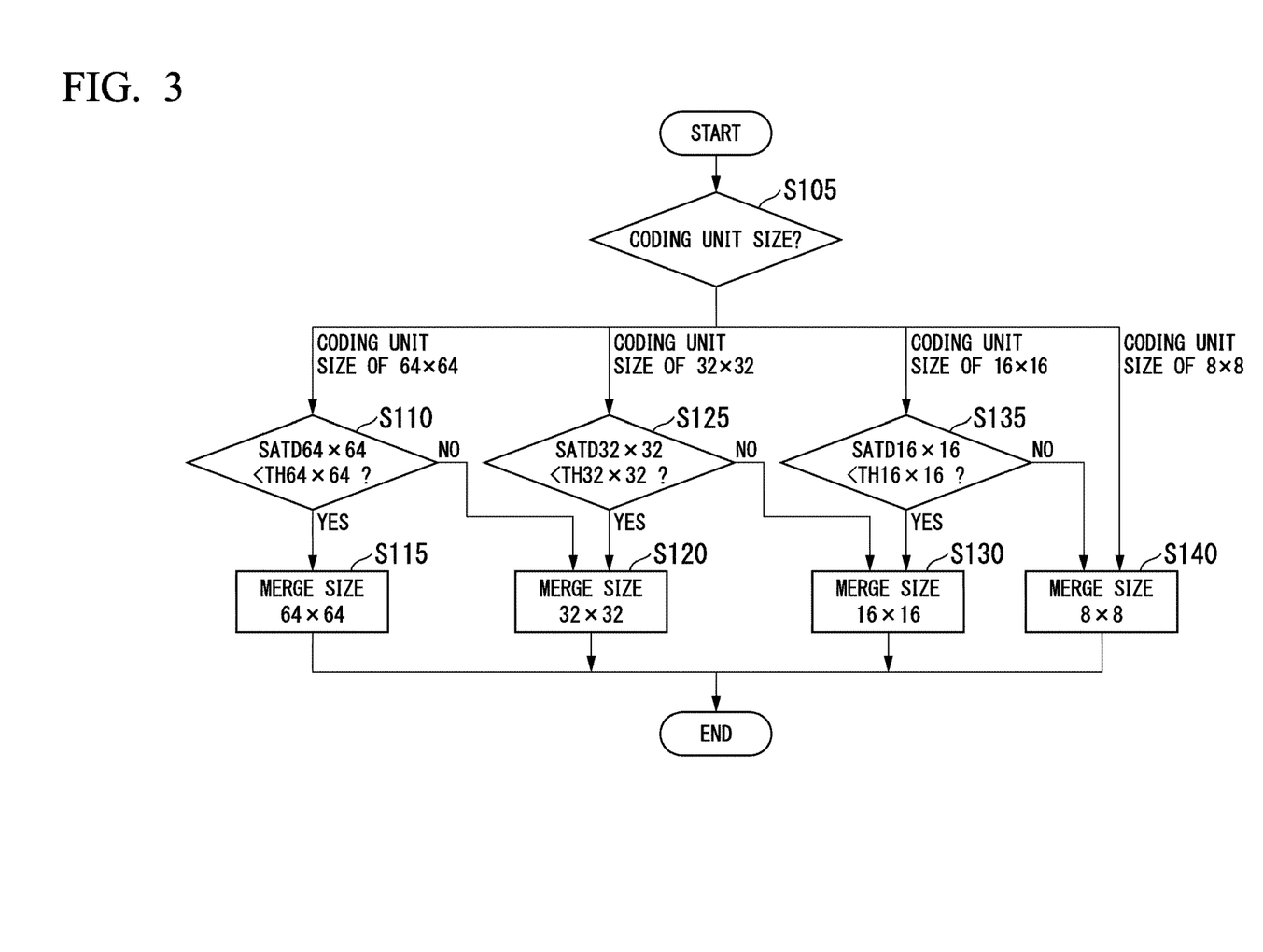
FIG. 3 is a flowchart showing an operation of a merge size determination unit shown in FIG. 2.

FIG. 3 is a flowchart showing an operation of the merge size determination unit 203 shown in FIG. 2. The merge size determination unit 203 performs the process shown in FIG. 2 for every coding unit and determines a merge size of the coding unit. Hereinafter, a coding unit of a target to determine a merge size is also referred to as a target coding unit.

The merge size determination unit 203 determines the coding unit size of the target coding unit determined by the coding unit size determination unit 202 (step S105). When the coding unit size is 64×64 (step S105: coding unit size of 64×64), the orthogonal transform unit 2032 calculates the SATD value from the residual signal of the target coding unit calculated by the prediction error calculating unit 2031 and assigns the SATD value to SATD64×64. The size determination unit 2033 compares SATD64×64 with a threshold value TH64×64 (step S110). The size determination unit 2033 determines the merge size of the target coding unit to be 64×64 which is the same as the coding unit size (step S115) when SATD64×64 is determined to be smaller than the threshold value TH64×64 (step S110: YES). On the other hand, the size determination unit 2033 determines the merge size of the target coding unit to be 32×32 which is one size smaller than the coding unit size (step S120) when SATD64×64 is determined to be equal to or greater than the threshold value TH64×64 because coding efficiency of the coding unit size is likely to be poor (step S110: NO). Thus, a decrease in coding efficiency is suppressed.

Hereinafter, similarly, when the coding unit size is 32×32 (step S105: coding unit size of 32×32), the orthogonal transform unit 2032 calculates the SATD value from the residual signal of the target coding unit calculated by the prediction error calculating unit 2031 and assigns the SATD value to SATD32×32. The size determination unit 2033 compares SATD32×32 with a threshold value TH32×32 (step S125). The size determination unit 2033 determines the merge size of the target coding unit to be 32×32 which is the same as the coding unit size (step S120) when SATD32×32 is determined to be smaller than the threshold value TH32×32 (step S125: YES). On the other hand, the size determination unit 2033 determines the merge size to be 16×16 which is one size smaller than the coding unit size (step S130) when SATD32×32 is determined to be equal to or greater than the threshold value TH32×32 (step S125: NO).

When the coding unit size is 16×16 (step S105: coding unit size of 16×16), the orthogonal transform unit 2032 calculates the SATD value from the residual signal of the target coding unit calculated by the prediction error calculating unit 2031 and assigns the SATD value to SATD16×16. The size determination unit 2033 compares SATD16×16 with the threshold value TH16×16 (step S135). The size determination unit 2033 determines the merge size of the target coding unit to be 16×16 which is the same as the coding unit size (step S130) when SATD16×16 is determined to be smaller than the threshold value TH16×16 (step S135: YES). On the other hand, the size determination unit 2033 determines the merge size to be 8×8 which is one size smaller than the coding unit size (step S140) when SATD16×16 is determined to be equal to or greater than the threshold value (step S135: NO).

When the coding unit size is 8×8 (step S105: coding unit size of 8×8), the size determination unit 2033 determines the merge size of the target coding unit to be 8×8 which is the same as the coding unit size (step S140).

Several methods of determining a threshold value used for comparison with the SATD value are considered in the process of FIG. 3. A first aspect is a method in which different fixed values are used for every size. TH64×64, TH32×32, TH16×16, and TH8×8 are set in accordance with each coding unit size. In the case of the simplest method in which the SATD value is great under predetermined conditions at all times, the merge size is set to be a size which is one size smaller than the coding unit size of the target coding unit.

Figure 4:
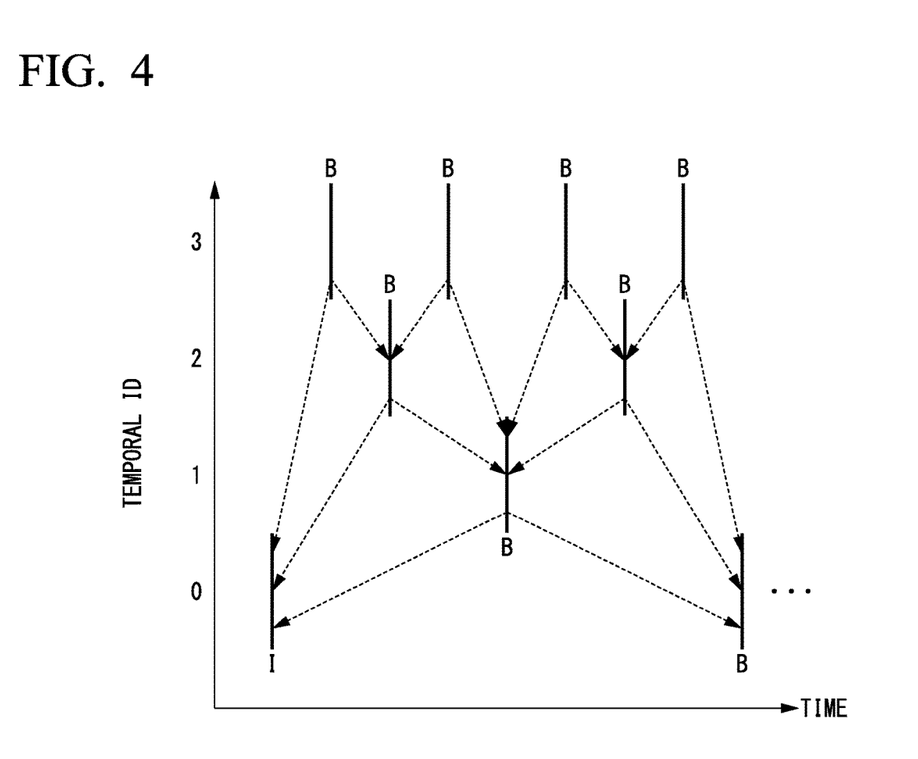
FIG. 4 is a graph showing a temporal ID in a hierarchical coding structure.

A second aspect is a method in which a threshold value is set in accordance with a temporal ID. FIG. 4 is a graph showing a temporal ID in a hierarchical coding structure. As shown in FIG. 4, the temporal ID is a value indicating a hierarchical depth when the hierarchical coding structure is used. B indicates a B picture, I indicates an I picture, and an arrow points to a picture which is referred to by the B picture. A distance between the B picture and a reference picture shortens as the temporal ID deepens. Thus, in general, an amount of codes of a picture is reduced. A merge mode of a large coding unit size is efficiently applied so that the amount of the codes of the picture when a layer is deep can be reduced. A reference threshold value (BaseTH) is prepared for each temporal ID (TemporalID) and is multiplied by a fixed value β as shown in the following Expressions (1) to (4). Thus, the threshold values are set such that it is less likely to divide the merge size as the layer deepens.

$$TH64\times64=\beta\times BaseTH[TemporalID] \tag{1}$$

$$TH32\times32=\beta\times BaseTH[TemporalID]/4 \tag{2}$$

$$TH16\times16=\beta\times BaseTH[TemporalID]/16 \tag{3}$$

$$TH8\times8=\beta\times BaseTH[TemporalID]/64 \tag{4}$$

A third aspect is a method in which a threshold value is set in accordance with a quantization parameter (QP). As described above, the merge mode of the large coding unit size is efficiently applied when an amount of assignment codes of the picture is small, whereas a merge mode of a small coding unit size is used when the amount of the assignment codes of the picture is large so that high-efficiency coding can be realized. Thus, the threshold values are set in accordance with a value of QP as shown in the following Expressions (5) to (8). γ is a fixed value.

$$TH64\times64=\gamma\times QP \tag{5}$$

$$TH32\times32=\gamma\times QP/4 \tag{6}$$

$$TH16\times16=\gamma\times QP/16 \tag{7}$$

$$TH8\times8=\gamma\times QP/64 \tag{8}$$

A fourth aspect is a method in which a variance of brightness values of a coding unit of a processing target is used in an original image. When the variance of the brightness is large, that is, when texture of the coding unit is fine, efficiency of coding performed using a small and fine coding unit size is better. On the other hand, when the variance of the brightness values is small, efficiency of coding performed using a large coding unit size to reduce an amount of codes is better. Thus, the threshold values are set in accordance with a variance (Var) of brightness values as shown in the following Expressions (9) to (12). ζ is a fixed value.

$$TH64 \times 64 = \zeta/Var \qquad (9)$$

$$TH32 \times 32 = \zeta/Var/4 \qquad (10)$$

$$TH16 \times 16 = \zeta/Var/16 \qquad (11)$$

$$TH8 \times 8 = \zeta/Var/64 \qquad (12)$$

A fifth aspect is a method in which an average value of SAD or SATD is used for a coding unit of the same coding unit size in a completely coded picture of the same temporal ID. The size determination unit 2033 sums SAD values or SATD values for every coding unit size every time each picture coding is completed, and calculates and stores average values. Also, when coding of a subsequent picture starts, the size determination unit 2033 reads an average value of the SAD values or the SATD values of each coding unit size acquired from a completely coded picture closest to the same temporal ID and performs scaling to adjust the value to set the value as a threshold value.

A method of setting the threshold value has been described above, but the above-described methods are merely examples. In addition, it is clear that the present invention is not limited to the above-described methods. Of course, the threshold value can be set by combining the methods. For example, when the threshold value is set by combining the temporal ID described in the second aspect and the quantization parameter described in the third aspect, the threshold is set as shown in the following Equations (13) to (16). η is a fixed value.

$$TH64 \times 64 = \eta \times BaseTH[TemporalID] \times QP \qquad (13)$$

$$TH32 \times 32 = \eta \times BaseTH[TemporalID] \times QP/4 \qquad (14)$$

$$TH16 \times 16 = \eta \times BaseTH[TemporalID] \times QP/16 \qquad (15)$$

$$TH8 \times 8 = \eta \times BaseTH[TemporalID] \times QP/64 \qquad (16)$$

In addition, a technique in which the merge size is determined to be the same size as the coding unit or a size which is one size smaller than the coding unit has been described in FIG. 3, but a technique in which the merge size is changed to a size which is two sizes smaller than the coding unit by adjusting the threshold values in a 64×64 size and a 32×32 size can also be considered.

Figure 5:
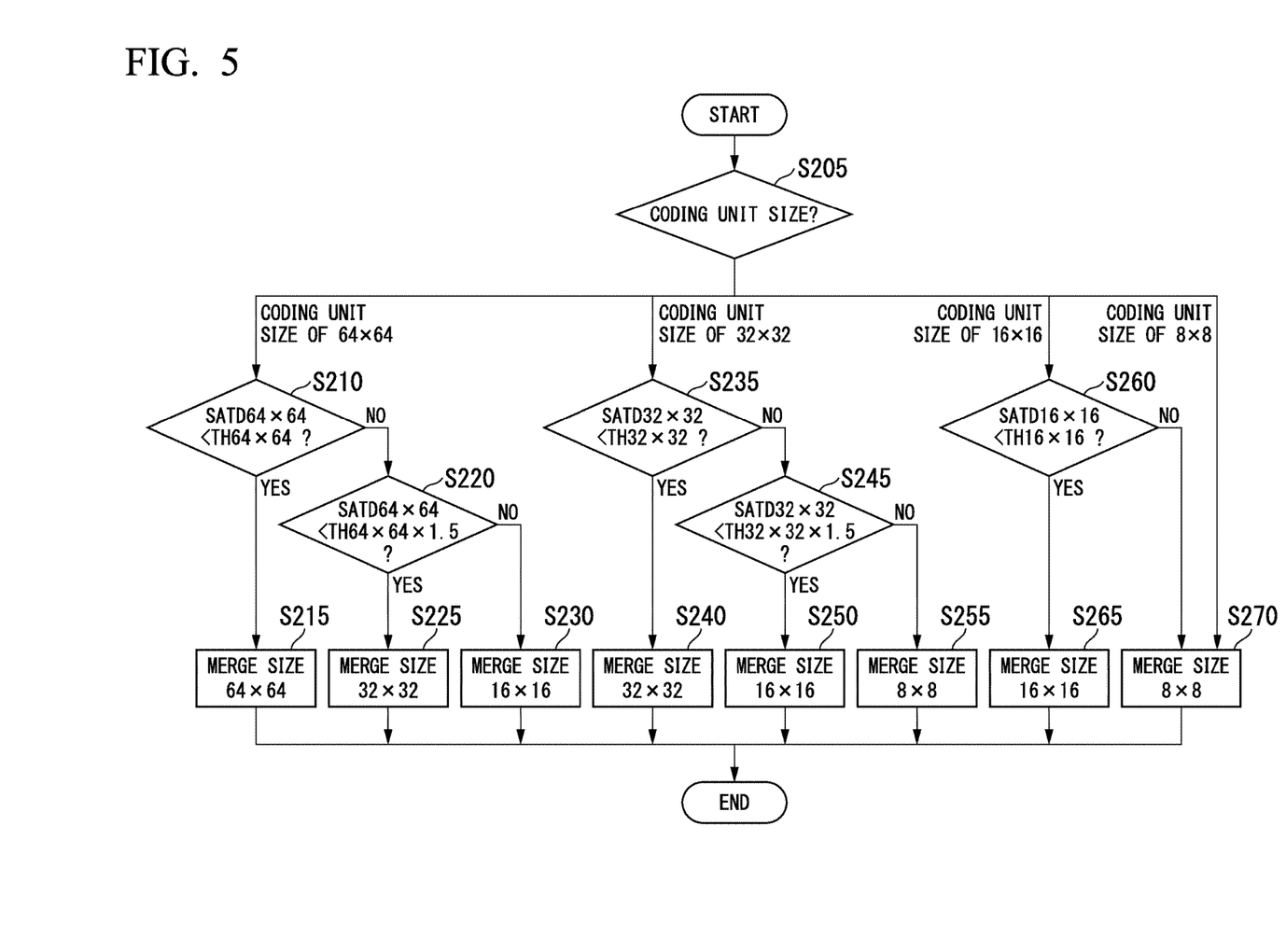
FIG. 5 is a flowchart showing an operation of the merge size determination unit shown in FIG. 2 (when a size can be reduced by two sizes).

FIG. 5 is a flowchart showing an operation the merge size determination unit 203 when the merge size can be changed to a size which is two sizes smaller than the coding unit in the 64×64 size and the 32×32 size. The merge size determination unit 203 determines a coding unit size of a target coding unit determined by the coding unit size determination unit 202 (step S205). When the coding unit size is 64×64 (step S205: coding unit size of 64×64), the orthogonal transform unit 2032 calculates SATD64×64 serving as the SATD value of the target coding unit. The size determination unit 2033 compares SATD64×64 with the threshold value TH64×64 (a first threshold value) (step S210). The size determination unit 2033 determines the merge size to be 64×64 which is the same as the coding unit size (step S215) when SATD64×64 is determined to be smaller than the threshold value TH64×64 (step S210: YES). The size determination unit 2033 compares SATD64×64 with a threshold value TH64×64×1.5 (a second threshold value) (step S220) when SATD64×64 is determined to be equal to or greater than the threshold value TH64×64 (step S210: NO). The size determination unit 2033 determines the merge size to be 32×32 (step S225) when SATD64×64 is determined to be smaller than the threshold value TH64×64×1.5 (step S220: YES) and determines the merge size to be 16×16 (step S230) when the SATD64×64 is determined to be equal to or greater than the threshold value TH64×64×1.5 (step S220: NO).

When the coding unit size is 32×32 (step S205: coding unit size of 32×32), the orthogonal transform unit 2032 calculates SATD32×32 serving as the SATD value of the target coding unit. The size determination unit 2033 compares SATD32×32 with the threshold value TH32×32 (the first threshold value) (step S235). The size determination unit 2033 determines the merge size to be 32×32 which is the same as the coding unit size (step S240) when SATD32×32 is determined to be smaller than the threshold value TH32×32 (step S235: YES). The size determination unit 2033 compares SATD32×32 with the threshold value TH32×32×1.5 (the second threshold value) (step S245) when SATD32×32 is determined to be equal to or greater than the threshold value TH32×32 (step S235: NO). The size determination unit 2033 determines the merge size to be 16×16 (step S250) when SATD32×32 is determined to be smaller than the threshold value TH32×32×1.5 (step S245: YES) and determines the merge size to be 8×8 (step S255) when the SATD32×32 is determined to be equal to or greater than the threshold value TH32×32×1.5 (step S245: NO).

Processes of the size determination unit 2033 are the same as the processes shown in FIG. 5 when the coding unit size is 16×16 (step S205: coding unit size of 16×16) and 8×8 (step S205: coding unit size of 8×8). In other words, the size determination unit 2033 compares SATD16×16 with the threshold value TH16×16 (step S260) when the coding unit size is 16×16 (step S205: coding unit size of 16×16). The size determination unit 2033 determines the merge size to be 16×16 (step S265) when SATD16×16 is determined to be smaller than the threshold value TH16×16 (step S260: YES) and determines the merge size to be 8×8 (step S270) when the SATD16×16 is determined to be equal to or greater than the threshold value (step S260: NO). In addition, the size determination unit 2033 determines the merge size to be 8×8 (step S270) when the coding unit size is 8×8 (step S205: coding unit size of 8×8).

In an example of FIG. 5, the values which are 1.5 times the threshold values TH64×64 and TH32×32 are set to be the second threshold values, but a degree of scaling can be arbitrarily set.

Figure 6:
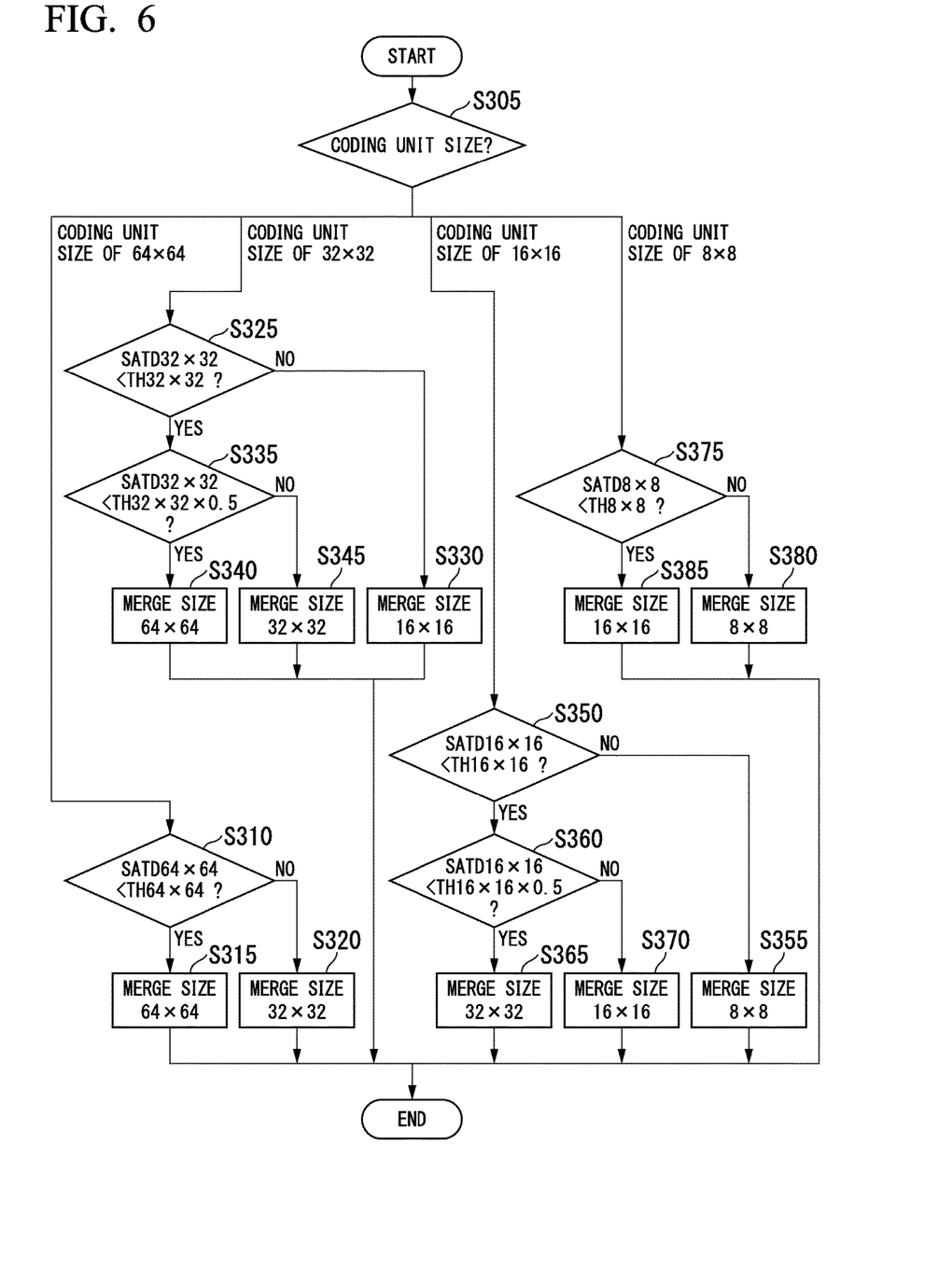
FIG. 6 is a flowchart showing an operation of the merge size determination unit show in FIG. 2 (when a size can be increased/reduced by one size).

Also, the merge size can be changed to three types of sizes, that is, the size which is one size greater than the coding unit size, the size which is the same as the coding unit size, and the size which is one size smaller than the coding unit size, through the same threshold process. FIG. 6 is a flowchart showing an operation of the merge size determination unit 203 when the merge size can be changed to one of the three types of sizes. The merge size determination unit 203 determines a coding unit size of a target coding unit determined by the coding unit size determination unit 202 (step S305). A process of the merge size determination unit 203 is the same as the process shown in FIG. 3 when the coding unit size is 64×64 (step S305: coding unit size of 64×64). In other words, the size determination unit 2033 determines the merge size to be 64×64 (step S315) when SATD64×64 is determined to be smaller than the threshold value TH64×64 (step S310: YES). The merge size is determined to be 32×32 (step S320) when SATD64×64 is determined to be equal to or greater than the threshold value TH64×64 (step S310: NO).

The orthogonal transform unit 2032 calculates SATD32×32 serving as the SATD value of the target coding unit when the coding unit size is 32×32 (step S305: coding unit size of 32×32). The size determination unit 2033 compares SATD32×32 with a threshold value TH32×32 (a first threshold value) (step S325). The size determination unit 2033 determines the merge size to be 16×16 (step S330) when SATD32×32 is determined to be equal to or greater than the threshold value TH32×32 (step S325: NO). The size determination unit 2033 compares SATD32×32 with a threshold value TH32×32×0.5 (a second threshold value) (step S335) when SATD32×32 is determined to be smaller than the threshold value TH32×32 (step S325: YES). The size determination unit 2033 determines the merge size to be 64×64 (step S340) when SATD32×32 is determined to be smaller than the threshold value TH32×32×0.5 (step S335: YES) and determines the merge size to be 32×32 (step S345) when SATD32×32 is determined to be equal to or greater than the threshold value TH32×32×0.5 (step S335: NO).

The orthogonal transform unit 2032 calculates SATD16×16 serving as the SATD value of the target coding unit when the coding unit size is 16×16 (step S305: coding unit size of 16×16). The size determination unit 2033 compares SATD16×16 with a threshold value TH16×16 (a first threshold value) (step S350). The size determination unit 2033 determines the merge size to be 8×8 (step S355) when SATD16×16 is determined to be equal to or greater than the threshold value TH16×16 (step S350: NO). The size determination unit 2033 compares SATD16×16 with a threshold value TH16×16×0.5 (a second threshold value) (step S360) when SATD16×16 is determined to be smaller than the threshold value TH16×16 (step S350: YES). The size determination unit 2033 determines the merge size to be 32×32 (step S365) when SATD16×16 is determined to be smaller than the threshold value TH16×16×0.5 (step S360: YES) and determines the merge size to be 16×16 (step S370) when SATD16×16 is determined to be equal to or greater than the threshold value TH16×16×0.5 (step S360: NO).

The orthogonal transform unit 2032 calculates SATD8×8 serving as the SATD value of the target coding unit when the coding unit size is 8×8 (step S305: coding unit size of 8×8). The size determination unit 2033 compares SATD8×8 with a threshold value TH8×8 (step S375). The size determination unit 2033 determines the merge size to be 8×8 (step S380) when SATD8×8 is determined to be equal to or greater than the threshold value 8×8 (step S375: NO) and determines the merge size to be 16×16 (step S385) when SATD8×8 is determined to be smaller than the threshold value TH8×8 (step S385: YES).

In an example of FIG. 6, the threshold value TH32×32 is set to be the first threshold value and the value which is 0.5 times TH16×16 is set to be the second threshold value, but a degree of scaling can be arbitrarily set.

According to the above-described embodiments, the video coding apparatus 100 predetermines block sizes used to evaluate merge candidates from prediction results of predicted motion vector candidates so that an amount of calculation needed to calculate evaluation values of the merge candidates can be reduced. In other words, the merge size determination unit 203 determines the merge size in accordance with the SATD value calculated from the coding unit of the coding unit size determined by the coding unit size determination unit 202. Thus, the merge mode evaluation unit 204 can evaluate the merge mode with a small amount of calculation. Therefore, the video coding apparatus 100 can reduce an amount of calculation needed for the motion prediction without reducing coding efficiency.

The above-described video coding apparatus 100 performs motion prediction in units of coding units (coded blocks) on a picture of a coded target using a temporal correlation between input video signals and performs a coding process on a difference therebetween. Also, the coding unit size determination unit 202 of the video coding apparatus 100 determines an optimum coding unit size by performing the motion prediction process on every coding unit. The merge size determination unit 203 calculates a prediction error value (SAD) serving as a difference between a predicted image of the determined coding unit size and the original image. The merge size determination unit 203 determines the coding unit size of the merge mode by comparing an orthogonal transformed value obtained by performing the orthogonal transform such as the Hadamard transform on the calculated prediction error value or the calculated prediction error value with a threshold value. The merge mode evaluation unit 204 calculates the evaluation value by performing the motion prediction process of the merge candidates on the target coding unit of the determined merge size. As described above, the coding unit sizes used to perform the motion prediction process on the merge candidates are predetermined in a video coding method in which the coding is performed using the motion prediction so that an effect in which the amount of calculation needed for the motion prediction can be reduced without reducing coding efficiency is acquired.

The video coding apparatus 100 in the above-described embodiments may be realized by a computer. In this case, a program for realizing a function thereof is recorded on a computer-readable recoding medium, and the program recorded on the recoding medium is read by and executed in a computer system so that the video coding apparatus 100 may be realized by the computer. Also, "the computer system" described here is assumed to include an operating system (OS) and hardware such as peripheral apparatuses. "The computer-readable recording medium" refers to a non-transitory computer-readable storage apparatus such as a portable medium, such as a flexible disk, a magneto optical disc, a ROM, and a CD-ROM, and a hard disk built in a computer system. Also, "the computer-readable recording medium" may also include a medium which dynamically holds a program during a short period of time such as a communication line when the program is transmitted via a network such as the Internet or a communication line such as a telephone line and a medium which holds the program during a certain period of time such as a volatile memory inside the computer system serving as a server or a client when the program is transmitted via a network such as the Internet or a communication line such as a telephone line.

In addition, the above-described program may be a program for realizing some of the above-described functions, may be a program in which the above-described functions can be realized by combining the program and a program which is already recorded on the computer system, and may be a program which is realized using hardware such as a programmable logic apparatus (PLD), a field programmable gate array (FPGA) apparatus, etc.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The present invention can be applied to a video coding apparatus or a video coding program in which an amount of calculation needed to determine a motion prediction process and a coding mode is limited.

What is claimed is:

1. A video coding apparatus in which motion prediction is performed on each picture of an input video signal in units of coding units using a temporal correlation of the picture, and a coding process is performed on a difference between the input video signal and a predicted image generated on the basis of result of the motion prediction, the video coding apparatus comprising:
- a motion prediction unit configured to perform the motion prediction for a plurality of coding unit sizes of an original image serving as the picture of the input video signal and evaluate results obtained by the motion prediction for the coding unit sizes so as to supply a first evaluation value;
- a coding unit size determination unit configured to determine one of the coding unit sizes of the original image as a determined coding unit size on the basis of the first evaluation value;
- a prediction error calculating unit configured to calculate a prediction error value serving as a difference between the original image and the prediction image based on the determined coding unit size;
- an orthogonal transform unit configured to calculate an orthogonal transform value by performing a Hadamard transform on the prediction error value;
- a merge size determination unit configured to determine a merge size serving as a coding unit size of a merge mode on the basis of comparison between the orthogonal transform value and a threshold value;
- a merge mode evaluation unit configured to evaluate each of merge candidates on a coding unit of the merge size determined by the merge size determination unit so as to supply a second evaluation value of each of the merge candidates; and
- an inter-prediction mode determination unit configured to determine a mode used for coding on the basis of the second evaluation value obtained by the merge mode evaluation unit and the first evaluation value of the coding unit size determined by the coding unit size determination unit.

2. A video coding apparatus in which motion prediction is performed on each picture of an input video signal in units of coding units using a temporal correlation of the picture, and a coding process is performed on a difference between the input video signal and a predicted image generated on the basis of result of the motion prediction, the video coding apparatus comprising:
- a motion prediction unit configured to perform the motion prediction for a plurality of coding unit sizes of an original image serving as the picture of the input video signal and evaluate results obtained by the motion prediction for the coding unit sizes so as to supply a first evaluation value;
- a coding unit size determination unit configured to determine one of the coding unit sizes of the original image as a determined coding unit size on the basis of the first evaluation value;
- a prediction error calculating unit configured to calculate a prediction error value serving as a difference between the original image and the prediction image based on the determined coding unit size;
- a merge size determination unit configured to determine a merge size serving as a coding unit size of a merge mode on the basis of comparison between the prediction error value and a threshold value;
- a merge mode evaluation unit configured to evaluate each of merge candidates on a coding unit of the merge size determined by the merge size determination unit so as to supply a second evaluation value of each of the merge candidates; and
- an inter-prediction mode determination unit configured to determine a mode used for coding on the basis of the second evaluation value obtained by the merge mode evaluation unit and the first evaluation value of the coding unit size determined by the coding unit size determination unit.

3. The video coding apparatus according to claim 1, wherein the merge size determination unit determines the merge size to be the same size as the coding unit size of the coding unit when the orthogonal transform value is smaller than the threshold value and determines the merge size to be a size which is one size smaller than the coding unit size of the coding unit when the orthogonal transform value is equal to or greater than the threshold value.

4. The video coding apparatus according to claim 2, wherein the merge size determination unit determines the merge size to be the same size as the coding unit size of the coding unit when the prediction error value is smaller than the threshold value and determines the merge size to be a size which is one size smaller than the coding unit size of the coding unit when the prediction error value is equal to or greater than the threshold value.

5. The video coding apparatus according to claim 1, wherein the threshold value includes a first threshold value and a second threshold value being greater than the first threshold value,
wherein the merge size determination unit determines the merge size to be the same size as the coding unit size of the coding unit when the orthogonal transform value is smaller than the first threshold value, determines the merge size to be a size which is one size smaller than the coding unit size of the coding unit when the orthogonal transform value is equal to or greater than the first threshold value and smaller than the second threshold value, and determines the merge size to be a size which is two sizes smaller than the coding unit size of the coding unit when the orthogonal transform value is equal to or greater than the second threshold value.

6. The video coding apparatus according to claim 2, wherein the threshold value includes a first threshold value and a second threshold value being greater than the first threshold value,
wherein the merge size determination unit determines the merge size to be the same size as the coding unit size of the coding unit when the prediction error value is smaller than the first threshold value, determines the merge size to be a size which is one size smaller than the coding unit size of the coding unit when the prediction error value is equal to or greater than the first threshold value and smaller than the second threshold value, and determines the merge size to be a size which is two sizes smaller than the coding unit size of the coding unit when the prediction error value is equal to or greater than the second threshold value.

7. The video coding apparatus according to claim 1, wherein the threshold value includes a first threshold value and a second threshold value being smaller than the first threshold value, wherein the merge size determination unit determines the merge size to be a size which is one size smaller than the coding unit size of the coding unit when the orthogonal transform value is equal to or greater than the first threshold value, determines the merge size to be the same size as the coding unit size of the coding unit when the orthogonal transform value is smaller than the first threshold value and equal to or greater than the second threshold value, and determines the merge size to be a size which is one size greater than the coding unit size of the coding unit when the orthogonal transform value is smaller than the second threshold value.

8. The video coding apparatus according to claim 2,
wherein the threshold value includes a first threshold value and a second threshold value being smaller than the first threshold value,
wherein the merge size determination unit determines the merge size to be a size which is one size smaller than the coding unit size of the coding unit when the prediction error value is equal to or greater than the first threshold value, determines the merge size to be the same size as the coding unit size of the coding unit when the prediction error value is smaller than the first threshold value and equal to or greater than the second threshold value, and determines the merge size to be a size which is one size greater than the coding unit size of the coding unit when the prediction error value is smaller than the second threshold value.

9. The video coding apparatus according to claim 1,
wherein the merge size determination unit determines the threshold value by scaling the average of orthogonal transform values of coding units in a completely coded picture, the coding units in the completely coded picture have the same coding unit size and the same temporal ID as the coding unit in the original image, and the temporal ID indicates a hierarchical depth in hierarchical coding.

10. The video coding apparatus according to claim 2,
wherein the merge size determination unit determines the threshold value by scaling the average of prediction error values of coding units in a completely coded picture, the coding units in the completely coded picture have the same coding unit size and the same temporal ID as the coding unit in the original image, and the temporal ID indicates a hierarchical depth in hierarchical coding.

11. The video coding apparatus according to claim 1,
wherein the threshold value is determined in accordance with a temporal ID indicating a depth in hierarchical coding.

12. The video coding apparatus according to claim 2,
wherein the threshold value is determined in accordance with a temporal ID indicating a depth in hierarchical coding.

13. The video coding apparatus according to claim 1,
wherein the threshold value is determined in accordance with a value of a quantization parameter obtained on a quantization process.

14. The video coding apparatus according to claim 2,
wherein the threshold value is determined in accordance with a value of a quantization parameter obtained on a quantization process.

15. The video coding apparatus according to claim 1,
wherein the threshold value is determined by scaling variance of brightness values of the coding unit.

16. The video coding apparatus according to claim 2,
wherein the threshold value is determined by scaling variance of brightness values of the coding unit.

* * * * *